Aug. 30, 1966  P. V. DOBSON  3,269,744
TRUCKS
Filed March 12, 1963  6 Sheets-Sheet 1
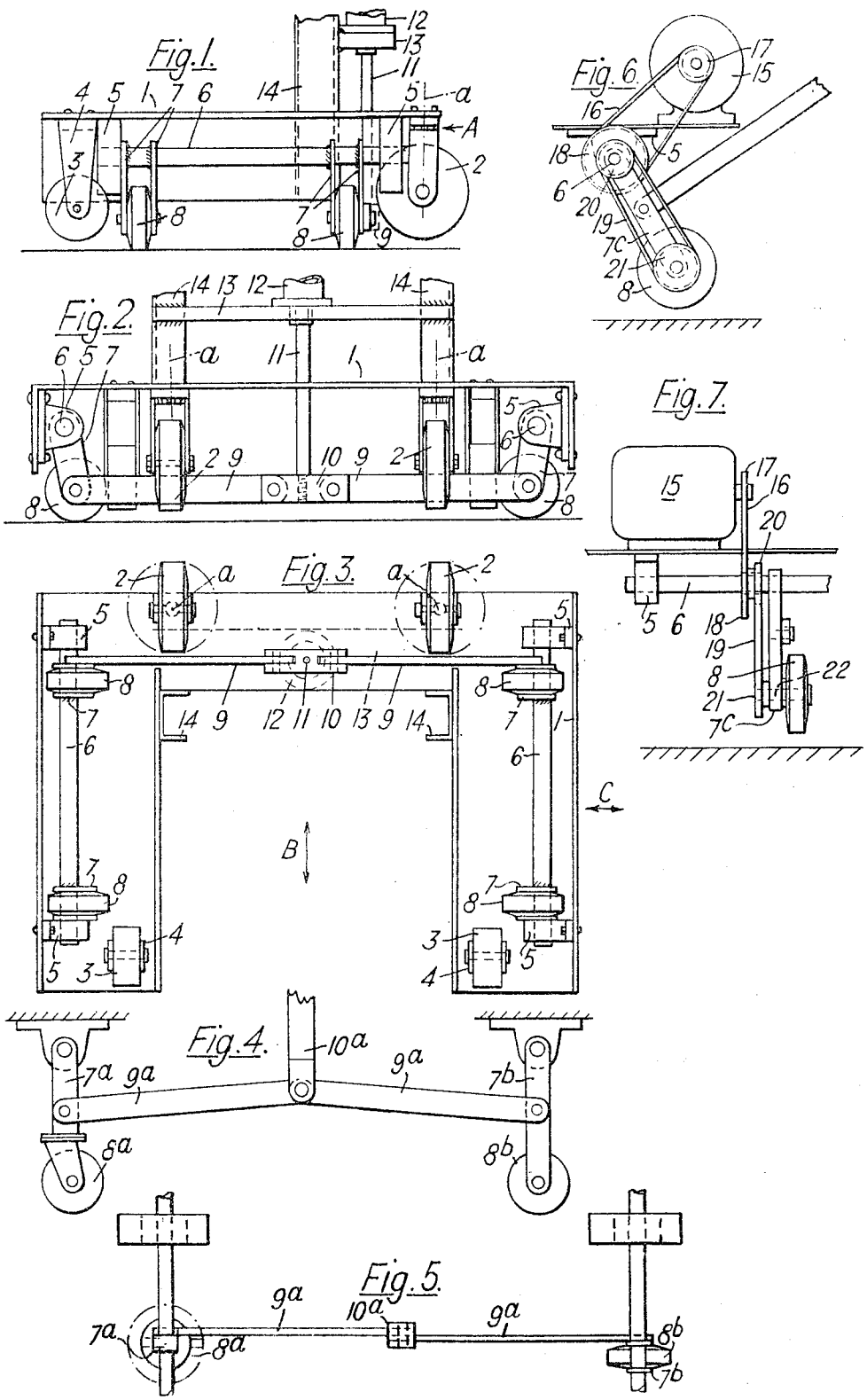

Aug. 30, 1966 P. V. DOBSON 3,269,744
TRUCKS
Filed March 12, 1963 6 Sheets-Sheet 2
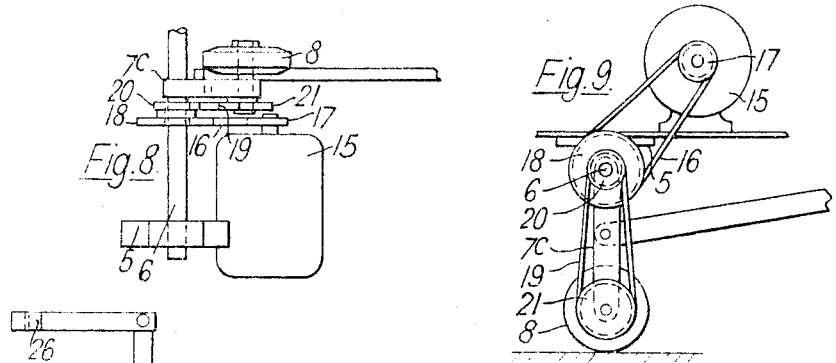
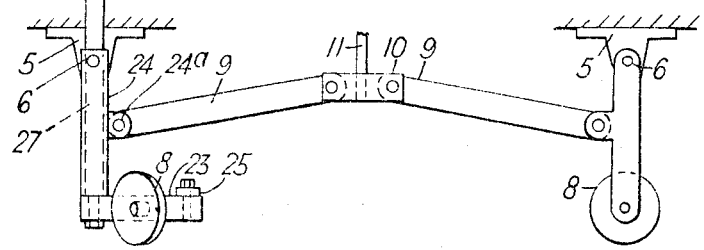
Fig. 10.
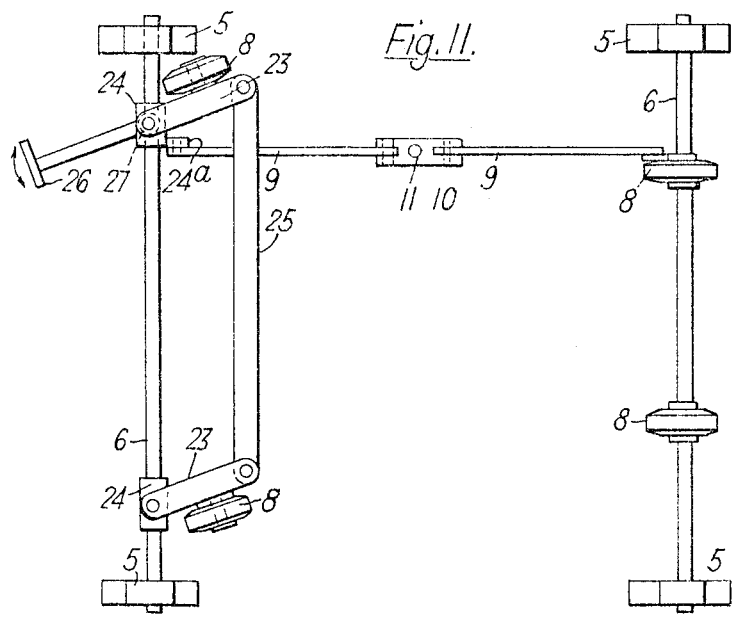
Fig. 11.

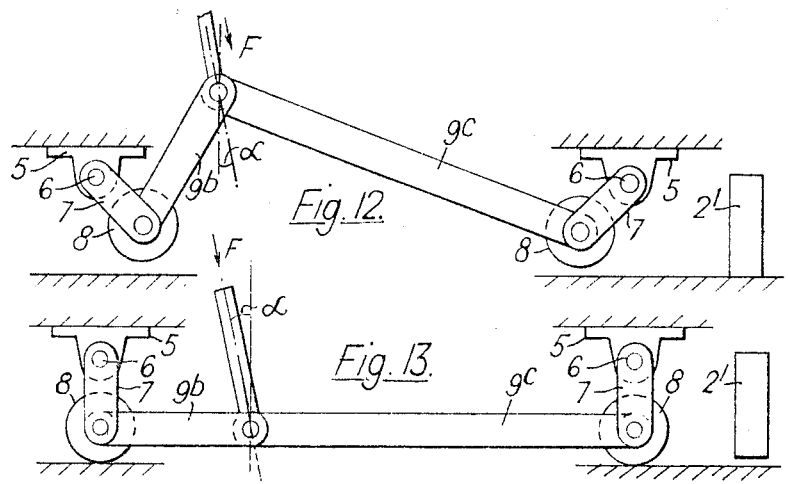
Fig. 12.
Fig. 13.
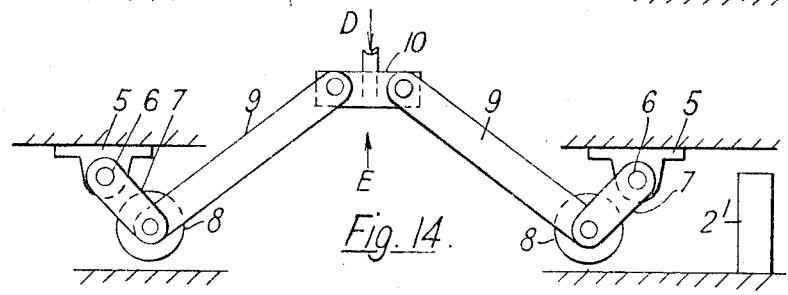
Fig. 14.
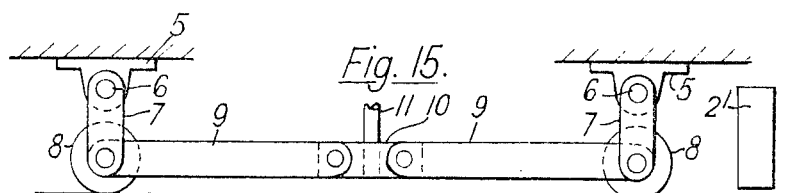
Fig. 15.
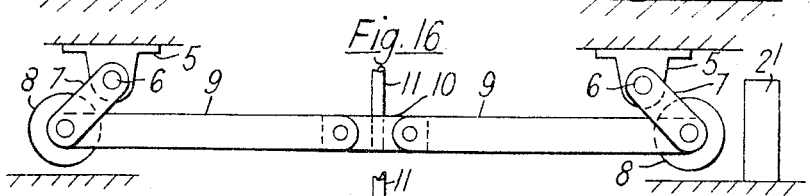
Fig. 16.
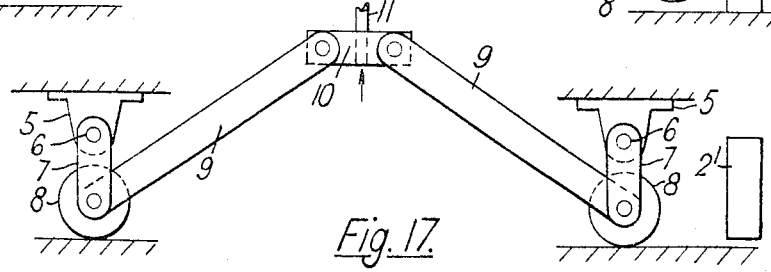
Fig. 17.

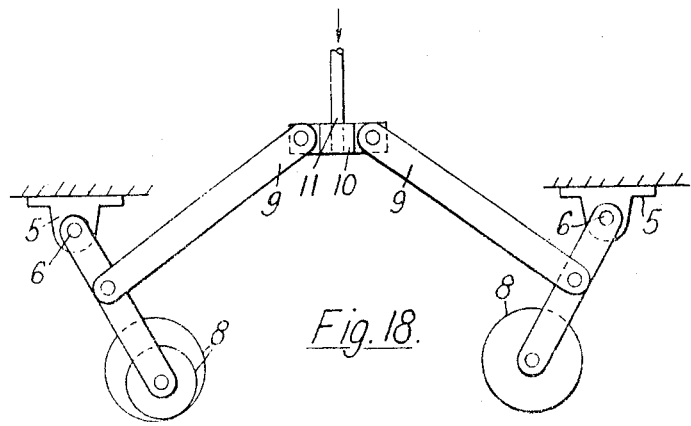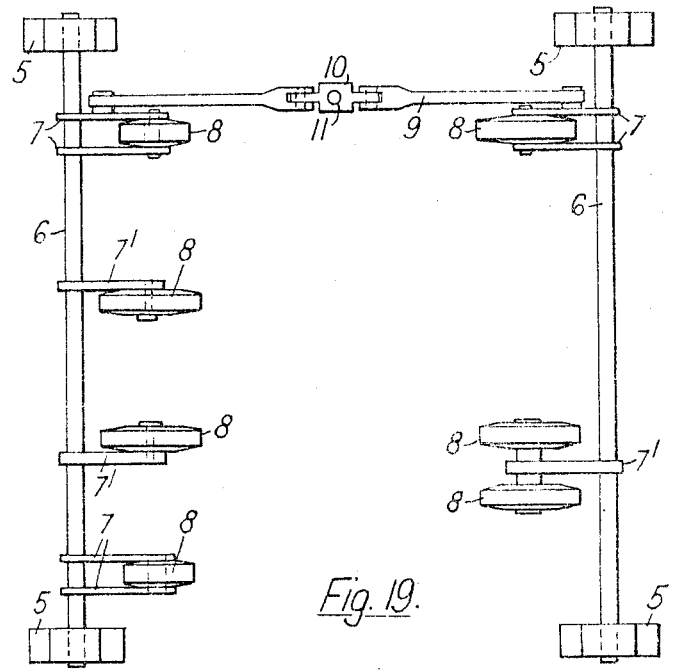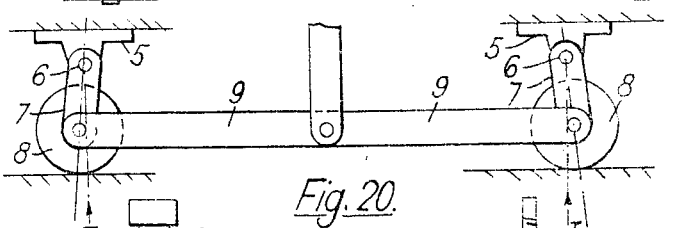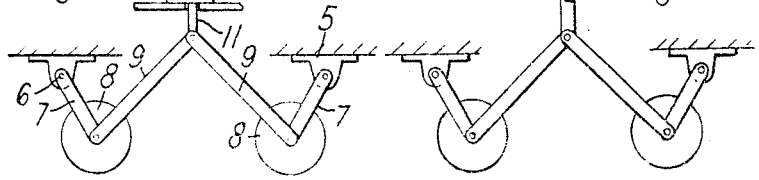

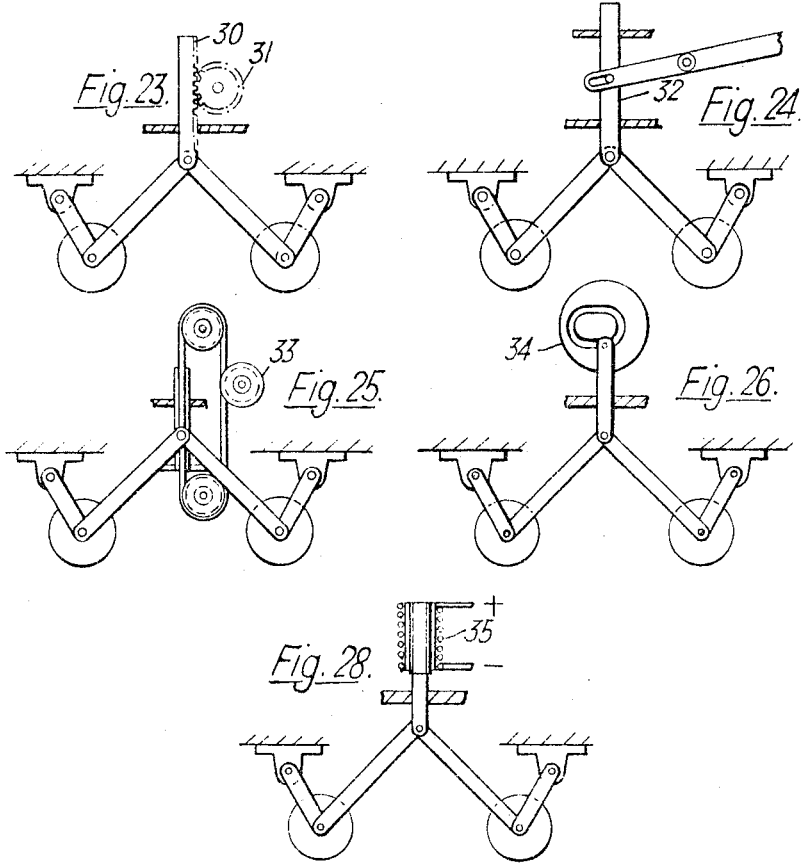

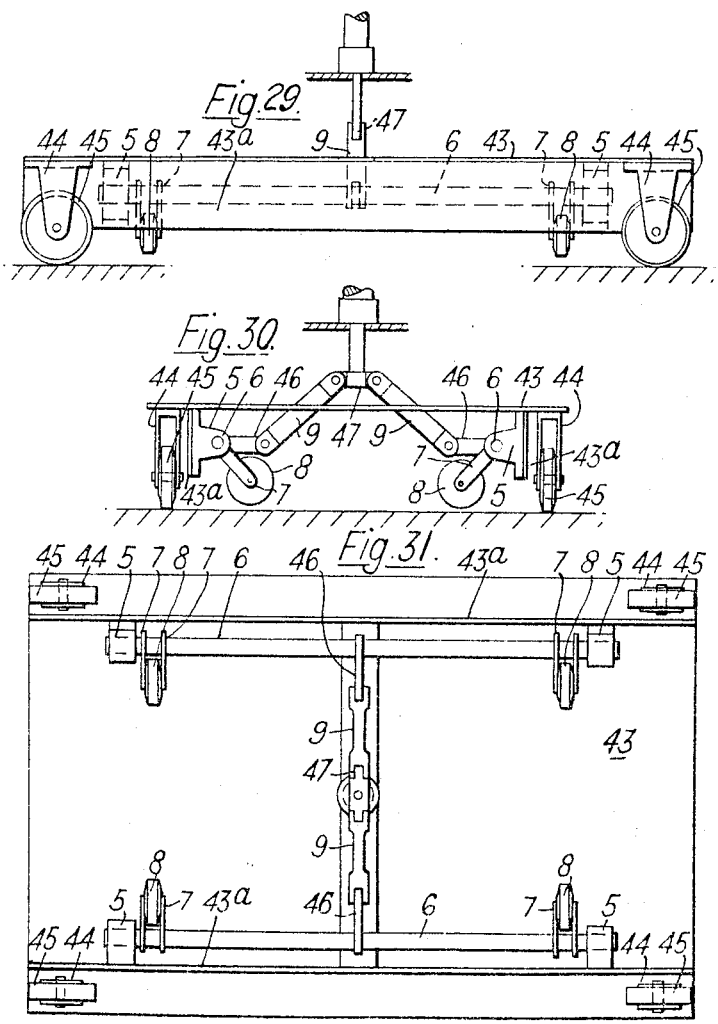

United States Patent Office 3,269,744
Patented August 30, 1966

3,269,744
TRUCKS
Peter V. Dobson, 1 Wentworth Road,
Leicester, England
Filed Mar. 12, 1963, Ser. No. 264,670
Claims priority, application Great Britain, Mar. 15, 1962,
9,915/62
13 Claims. (Cl. 280—43.17)

This invention relates to trucks including rail vehicles, i.e. wheeled carriages adapted to be propelled from place to place for the transport of articles, goods or persons carried thereby.

The invention, moreover, is applicable both to a class of truck which is steerable or has a swivel wheel and consequently has a conventional turning circle as well as to a truck of the class furnished with any suitable arrangement of non-steerable and non-swivelling wheels, and which, by virtue of having no turning circle, is normally only capable of being propelled along a predetermined straight path.

Included within the trucks to which the invention may be applied are low wheeled carriages, drays, wheeled platforms and skips, fork-lift trucks, side-loading trucks, straddle-legged elevator trucks and conventional road transport vehicles, both goods and passenger types.

Although the invention may be applied to hand-propelled trucks there is no limitation in this respect since, as will be appreciated from above, certain forms of motorised trucks are included within its scope.

As regards a non-steerable truck, other than a rail truck, this heretofore could only be caused to change direction in one of two ways, viz. either by first tipping it up at one end to lift one or more of its wheels clear of the floor or ground, thereby enabling the truck to be slewed round into the new direction, or by forcibly causing the truck to skid round at one end. But even these difficult manoeuvres were rendered practically impossible in the case of a heavily loaded truck. A change in the direction of a rail truck was heretofore only practicable by the use of a turn-table.

Then certain difficulties have heretofore been experienced even with trucks which are manoeuvrable by virtue of the provision of steering mechanism or swivel wheels. For example, conventional fork lift trucks have great manoeuvrability either from swivel wheels or coupled steering mechanisms. However, they are often called upon to carry long loads across their widths. This means that gangways have to be wide enough to accommodate the widest load. It will be appreciated that if the load was transported lengthways down any gangway such gangways could be much narrower, thus saving space.

The invention aims, inter alia, to enable loads to be carried in this way whilst at the same time enabling conventional wheel arrangements for stacking purposes to be retained.

Moreover, conventional steering mechanisms are subject to various disadvantages. Thus, to enable a truck to be steered efficiently it is required to have a combination of fixed and steerable wheels. As a consequence, the truck requires room in which to manouvre and cannot travel sideways. If, on the other hand, a truck is furnished only with swivel wheels, then the truck becomes almost impossible to control—especially when loaded and travelling over uneven ground. With the aim of overcoming these difficulties a steering mechanism could be fitted to each wheel, although such a system would be very expensive and in many cases quite impracticable.

The primary object of the present invention is to obviate the foregoing disadvantages by the provision of a truck equipped with a simple, readily operable mechanism designed to enable the direction of the truck to be changed, without any changes in the dispositions of the normal wheels of the truck being effected, as will be hereinafter described.

A particular aim is to enable a truck to move in more than one straight line suchwise as to achieve economies in space and time.

Thus, as far as a rail truck is concerned, another aim is to enable a change in the direction thereof to be readily effected without the need for a turn-table.

According to this invention, the improved truck, in addition to being fitted with a set of main wheels appropriate to the normal use of the truck, which main wheels may be of the steerable, swivelling or fixed type, has mounted beneath it an under-carriage equipped with a set of auxiliary wheels, this under-carriage being adapted to be raised and lowered, and means operable at the will of the attendant of the truck being provided for either lowering the said under-carriage into an operative position in which only the auxiliary wheels are in contact with the ground or retracting the under-carriage into its raised inoperative position in which only the main wheels are in contact with the ground.

As will be appreciated, whenever the under-carriage is lowered it automatically functions to lift the set of main wheels clear of the ground. Conversely, whenever the under-carriage is retracted, the main wheels are lowered on to the ground. In other words, the raising and lowering movements of the auxiliary wheels are relative to the set of main wheels.

In order that the invention may be more clearly understood and readily carried into practical effect, specific examples thereof will now be described with reference to the accompanying drawings, wherein:

FIGURE 1 is a side elevational view of a straddle type elevator truck having the invention applied thereto, and showing the under-carriage lowered and the set of main wheels clear of the ground, FIGURE 2 is an end view of the said truck as seeen in the direction of the arrow A in FIGURE 1, FIGURE 3 is an underside plan of the same, FIGURES 4 and 5 are detail elevational and plan views respectively of part of a set of auxiliary wheels at least one of which is of the swivelling or castor type, FIGURES 6, 7 and 8 are detail end, side and underside plan views respectively of a drive for an auxiliary wheel, FIGURE 6 showing the said wheel in its raised position, FIGURE 9 is an end view similar to FIGURE 6 but with the driveable auxiliary wheel in its lowered position, FIGURES 10 and 11 are elevational and underside plan views respectively of a complete set of auxiliary wheels two of which are steerable by means of a mechanism hereinafter to be described, FIGURES 12 and 13 are diagrammatic elevational views of auxiliary wheels respectively in their raised and lowered positions, and illustrates an arrangement wherein an off centre source of force is applied at a compensating angle, FIGURES 14 and 15 are two views somewhat similar to FIGURES 12 and 13 but showing a central source of force which acts downwardly to lower the auxiliary wheels, FIGURES 16 and 17 are two further similar views, this time showing a central source of force which acts upwardly to lower the auxiliary wheels, FIGURES 18 and 19 are elevational and underside plan views respectively depicting a further arrangement in which auxiliary wheels of a set are of various sizes, FIGURE 20 is an elevation of a still further arrangement including toggles adapted to lock auxiliary wheels of an undercarriage in their lowered positions.

FIGURES 21–26 and 28 diagrammatically illustrate different methods of force application, FIGURES 29, 30 and 31 are side elevational, end and underside plan views of a specific constructional example of the invention applied to a simple truck having a rectangular chassis.

Like parts are designated by similar reference characters throughout the drawings.

In FIGURES 1, 2 and 3, the illustrated straddle type elevator truck 1 is of the U-form depicted in FIGURE 3 and is furnished with four main wheels, viz one pair of castors 2 mounted to turn freely about vertical axes $a$, and a pair of smaller wheels 3 mounted in fixed fork-like brackets 4. The under-carriage mounted beneath the truck 1 in this particular example is suspended from pairs of axle bearings 5 which are bolted to opposite sides of the truck framework and have fitted therein two axles 6. These axles are turnable within the bearings 5 and have rigidly secured thereupon, towards their opposite ends, pairs of spaced arms 7 constituting movable components of the under-carriage and hereinafter for convenience referred to as "wheel arms." Between the arms of each such pair is mounted an auxiliary wheel 8. Thus, the under-carriage is furnished with a set of, in all, four auxiliary wheels 8. The lower ends of the pairs of arms 7 at the front end of the truck are suitably articulated to two so-called "pressure arms" 9 the inwardly directed inner ends of which are pivotally connected to a common pressure link 10. This link is adapted to be subjected to a single source of force for which purpose it is connected to the lower end of a vertically disposed piston rod 11 extending down from a hydraulic cylinder 12. As will be seen, the said cylinder is carried by a cross member 13 in turn attached to and supported by a pair of suitably spaced uprights 14. The arrangement is accordingly such that whenever a force is applied, from the hydraulic cylinder 12 and through the medium of the rod 11, downwardly upon the centre of the pressure link 10, the under-carriage will be lowered into the operative position shown in FIGURES 1 and 2 in which only the auxiliary wheels 8 are in contact with the ground. Conversely, whenever the rod 11 is drawn up into the cylinder 12, the under-carriage will be retracted into its raised inoperative position in which only the pairs of main wheels 2 and 3 are in contact with the ground.

In the example now being described the pressure arms 9 are thus subjected to a common single source of force arranged to act vertically on the centre line of the elevator truck suchwise as to maintain the equilibrium of the latter.

As will be appreciated, by so disposing the wheels 8 of the auxiliary set at a desired fixed angle with respect to the main wheels 2 and 3, a change of direction, corresponding to this angle, will be imparted to the forward propulsion of the truck upon the under-carriage being lowered into its operative position. For example, and as shown in FIGURES 1, 2 and 3, the auxiliary wheels 8 may be set with their axes at right angles to the axes of the main wheels 2 and 3, in which instance, of course, lowering of the under-carriage would enable the truck, without any steering or swivelling movement of any of the wheels, to change its direction of travel through 90°. This will be clear from the arrows B and C which show straight line directions of the main and auxiliary wheels respectively. Such an arrangement would, for instance, enable a conventional fork-lift truck or straddle type elevator truck such as that illustrated to be readily converted into a side-loading truck, and vice versa.

It is, however, to be clearly understood, that the wheels of the auxiliary set, or at least one or more of them, may if desired, be of the swivelling or castor type. This would enable the truck, when the under-carriage is lowered onto its operative position, to be readily pushed or otherwise propelled in any desired direction. In this two auxiliary wheels depicted, that designated 8$a$ is a swivel castor whereas the wheel 8$b$ is a fixed one. The wheel arms 7$a$ and 7$b$ are in this case articulated to pressure arms 9$a$ jointed to a pressure member 10$a$.

The under-carriage may, in fact, be furnished with regard, it will be seen in FIGURES 4 and 5 that of the any appropriate number of wheels or castors grouped in any desired manner and may also incorporate a drive or/and a steering mechanism. For example, in FIGURES 6, 7 and 8 there is illustrated an auxiliary wheel 8 which is adapted to be driven from an electric motor 15 through the medium of, say, belts and pulleys. Thus, in the example depicted, one endless belt 16 is passed around a pulley 17 secured upon the motor spindle and a larger pulley 18 free to rotate about the axle 6, whilst a second belt 19 is passed around a pulley 20 arranged to rotate together with the pulley 18 and a pulley 21 rotatable with the wheel 8 about the auxiliary wheel axle 22 set in the wheel arm 7$c$. In this example, a pressure arm 9 is articulated to the said wheel arm at a point intermediate its ends.

The steering mechanism shown in FIGURES 10 and 11 is applied to one pair only of two pairs of auxiliary wheels 8 with which the illustrated undercarriage is furnished. Thus, each of the two steerable auxiliary wheels is rotatably mounted upon a horizontally disposed steering arm 23 which is pivotally mounted beneath a wheel arm 24 rigidly secured upon and depending from the relevant axle 6. One of these two wheel arms 24 is provided intermediate its ends with a lug 24$a$ to which one of the two pressure arms 9 is pivoted. The ends of the steering arms 23 remote from the wheel arms 24 are articulated to the opposite ends of a straight connecting link 25. For steering the wheels concerned there is provided a manually operable lever 26 arranged to operate through the medium of a steering rod 27 which extends through the appropriate wheel arm 24.

In the event of its being impractical, in any particular application, to place the source of force on the centre line between the axles 6, the differences in the lengths of pressure arms 9$b$ and 9$c$ could be compensated by applying the force F at a suitable compensating angle $\alpha$ as clearly shown in FIGURES 12 and 13.

When more than one source of force is employed, these sources can be applied at any angle which best suits the particular embodiment. Thus, in one case the arrangement may be such that whenever the said source or sources is/or are caused to act downwardly upon the pressure arms the wheel arms shall be swung down to lower the auxiliary wheels into their operative positions, whereas action of the source or sources upwardly upon the pressure arms results in the wheel arms being swung upwardly to effect retraction of the auxiliary wheels into their inoperative positions. This is illustrated in FIGURES 14 and 15 wherein when the force acts downwardly in the direction of the arrow D upon the pressure link 10 the wheel arms 7 are swung down to lower the wheels 8 (see FIGURE 15), whereas action of the source of force upwardly in the direction of the arrow E upon 10 and the pressure arms 9 swings the wheel arms 7 upwardly.

Alternatively, the arrangement of the mechanism may be reversed so that upward action of the source or sources of force upon the pressure arms results in downward movement of the wheel arms, and vice versa, all as shown in FIGURES 16 and 17. In each of FIGURES 12–17, one of the main wheels of the truck is diagrammatically shown at 2'.

In any event, the under-carriage in the instances so far quoted may be regarded as being constituted by the composite structure comprising the wheel arms, the one or more similar arms (if any) connected therewith, the pressure arms and the means enabling force to be transmitted to the latter. If desired, auxiliary wheels of the under-carriage may be connected by axles enabling such auxiliary wheels of various sizes to be operated simultaneously, or in groups, as required. In FIGURES 18 and 19, typical different groupings of auxiliary wheels 8 and auxiliary wheels of different sizes are shown. As will be seen in FIGURE 19, some of the auxiliary wheels are mounted between pairs of wheels arms 7 whereas others are mounted on single wheel arms 7'.

In accordance with an optional feature of the invention, the hereindescribed mechanism may include toggles arranged to be created or operated by the pressure arms 9 for the purpose of locking the auxiliary wheels 8 at least in their operative positions, thereby obviating any necessity for additional locking means or a force to maintain the under-carriage in its position of use. Such an arrangement is illustrated in FIGURE 20 wherein it will be seen that with the under-carriage down, and the downwardly applied force removed the said under-carriage is locked in position by the toggles created at T by the pressure arms 9 from upwards reaction.

The acting force or each of the acting forces, as the case may be, may be applied in any one or more of a variety of ways. For example, there may be provided for this purpose a fluid pressure (hydraulic or pneumatic) operated ram 28 (FIGURE 21), a screw 29 (FIGURE 22), a rack and pinion mechanism 30, 31 (FIGURE 23) an arrangement of a lever or a pedal such as that depicted at 32 in FIGURE 24, or a system of winches or pulleys 33 (FIGURE 25). The or each force may also be applied by a cam 34 (FIGURE 26) or may even be applied magnetically, as at 35 in FIGURE 28.

From the foregoing it will be appreciated that there can be as many sources and types of force acting on the mechanism as may be required.

A specific constructional example of the invention as applied to a simple truck having a rectangular chassis will now be described with reference to FIGURES 29, 30 and 31.

In this example, there are fixed in position beneath the chassis 43 four forked wheel brackets 44 each fitted with a single main non-swivelling wheel 45 which protrudes below the lower edges of the chassis. There is one such bracket 44 and wheel 45 at each of the four corners of the truck. Secured respectively on two depending opposite sides 43a of the chassis are two pairs of widely spaced axle bearings 5 which extend inwardly from the said chassis sides at right angles thereto. Each of the four axle bearings 5 is located closely adjacent to one of the main wheels 45, and the co-axial axes of aligned bearing holes formed in the spaced axle bearings of each pair extends at right angles to the axes of the said main wheels.

Mounted to turn freely within each pair of axle bearings 5 is an axle 6 which extends parallel with the depending sides 43a of the chassis 43. Rigidly secured upon each axle 6, intermediate its ends, is an inwardly directed "pivot arm" 46. Towards each of its opposite ends each such axle 6 is also provided with a similarly inwardly directed forked wheel arm 7 between the spaced limbs of which is mounted a freely rotatable auxiliary wheel 8. Articulated to the inner end of each of the two pivot arms 46 is a pressure arm 9, and these pressure arms extend upwardly through the top of the truck chassis 43. The upper ends of the pressure arms 9 are articulated to the opposite ends of a short coupling 47. This coupling is in turn adapted to be connected or otherwise associated with means of any suitable character, e.g. a fluid pressure operated ram, for applying a force—vertically upwards or downwards—to the pressure arms 9 with the result already described herein. To maintain the equilibrium of the motion, the force must be applied perpendicularly from a central point of the mechanism. This is readily possible in the example just described since the axles 6 to which the wheel arms 7 are rigidly attached are positioned at opposite sides of the truck and at equal lateral distances from the longitudinal median line of the latter.

In fact, by positioning such axles along both sides of a truck, any force or motion exerted on them would be simultaneously transmitted to any wheel arms attached to them, and in this way it is possible to actuate whole series of wheel arms at respectively opposite sides of the truck by the application of force at a single, central point.

Where, as previously described herein, the mechanism is to be so arranged that a downwardly exerted force raises the auxiliary wheels, as illustrated in FIGURES 16 and 17, then the axle bearings 5, the axles 6, the wheel arms 7, the pivot arms 46 and the lower ends of the pressure arms 9 may conveniently all be located upon the outsides of the depending sides of the truck chassis.

An important feature of the present invention therefore is that retractable auxiliary wheels, provided at opposite sides of a truck to enable the direction of travel of such truck to be changed can be simultaneously raised by the application upon a single point of force controlled, if desired, from a remote location.

Examples of the utility of this invention are:

(a) To enable long loads to be lifted and stacked by conventional fork lift trucks, but then by using the auxiliary wheels enabling the truck to move sideways in a similar manner to a sideloader fork truck, thus transporting in much narrower gangways. This arrangement gives all the versatility of the conventional fork lift truck plus the space saving of the sideloader where long lengths are involved.

(b) With the conventional steering mechanism on, say a road vehicle, manoeuvring to park the vehicle in a restricted space is a very difficult operation and usually requires a space of at least 150% of the vehicles length. The application of the invention to a road vehicle would enable it to be parked in virtually its own length.

I claim:

1. A truck comprising a chassis; a set of main wheels fitted to said chassis; spaced axle bearings mounted on the chassis at opposite sides thereof; two axles mounted at opposite sides of said chassis and mounted to turn in said bearings; a set of wheel arms rigidly secured to each of the said two axles such that the wheel arms of each set are turnable in unison with the axle to which they are rigidly secured, at least one of said sets comprising more than one wheel arm, an auxiliary wheel mounted on each of said wheel arms, said auxiliary wheels being disposed with their axes at an angle with respect to the axes of the main wheels; a first pressure arm articulated to a wheel arm on a first side of the chassis and extending inwardly from said wheel arm, a second pressure arm articulated to a wheel arm on the opposite side of the chassis and extending inwardly from said wheel arm, a coupling means for connecting together the inner ends of said first and second pressure arms, and a means for applying a single force to said coupling means whereby as a consequence of the appropriate application of said single force the said axles are turned so that all the wheel arms are simultaneously swung downwardly to lower the auxiliary wheels into contact with the ground and automatically lift the chassis to raise the main wheels off the ground, and whereby the application of the said single force in the reverse direction causes the axles to be turned in the opposite direction and all the wheel arms to be swung upwardly simultaneously to raise the auxiliary wheels clear of the ground and at the same time lower the main wheels to the ground.

2. A truck according to claim 1 including a steering mechanism connected to the wheel arms of one of said sets.

3. A truck according to claim 1, wherein at least one of the auxiliary wheels is of the castor type whereby when the auxiliary wheels are lowered the truck can be propelled in any desired direction.

4. A truck according to claim 1, wherein the means for applying a single force to the coupling means is arranged to act vertically on a line extending centrally between the pivotal axes of the auxiliary wheel arms.

5. A truck according to claim 1, wherein the means for applying a single force to the coupling means is arranged to act off center with the respect to a line extending centrally between the pivotal axes of the auxiliary wheel arms, the resultant differences in the lengths of the pressure arms being compensated for by applying the force at a compensating angle.

6. A truck according to claim 1, wherein the means for applying the single force is such that application of the single force downwardly upon the pressure arms swings down the wheel arms to move the auxiliary wheels into contact with the ground, and the application of the force upwardly raises the auxiliary wheels.

7. A truck according to claim 1, wherein the means for applying the single force is such that application of the single force upwardly on the pressure arms swings down the wheel arms to move the auxiliary wheels into contact with the ground, and the application of the force downwardly raises the auxiliary wheels.

8. A truck according to claim 1, wherein at least one of said sets of wheel arms is fitted with auxiliary wheels of different diameters.

9. A truck according to claim 1, wherein the axles, the wheel arms, the pressure arms and the coupling means together form toggles arranged to be operated by said pressure arms for locking the auxiliary wheels at least in their operative lowered positions.

10. A truck according to claim 1 wherein the means for applying a single force includes a fluid pressure operated ram.

11. A truck according to claim 1 wherein the means for applying a single force includes a screw.

12. A truck according to claim 1 wherein the means for applying a single force includes a rack and pinion mechanism.

13. A truck according to claim 1 wherein the means for applying a single force includes a system of winches.

References Cited by the Examiner

UNITED STATES PATENTS

| | | | |
|---|---|---|---|
| 929,440 | 7/1909 | Iliff | 105—177 |
| 1,890,361 | 12/1932 | Beattie | 280—43.21 |
| 2,021,075 | 11/1935 | McGinness | 105—215 |
| 2,158,891 | 5/1939 | Beacher | 180—1 |
| 2,197,375 | 4/1940 | Dafnis | 105—177 |
| 3,003,571 | 10/1961 | Ash et al. | 180—1 |
| 3,005,508 | 10/1961 | White | 180—1 |

FOREIGN PATENTS

| | | |
|---|---|---|
| 128,094 | 12/1878 | France. |
| 978,113 | 4/1951 | France. |
| 1,058,435 | 5/1959 | Germany. |

OTHER REFERENCES

Whiting Corp., Bulletin T–112R, copyright 1953.
Whiting Corp., Bulletin T–128, copyright 1958.

BENJAMIN HERSH, *Primary Examiner.*

PHILIP ARNOLD, *Examiner.*

R. M. WOHLFARTH, C. C. PARSONS,
*Assistant Examiners.*